United States Patent [19]

Brown

[11] Patent Number: 4,924,897
[45] Date of Patent: May 15, 1990

[54] VENT SYSTEM

[75] Inventor: Harold R. Brown, Ashland, Ky.

[73] Assignee: Ashland Oil, Inc., Ashland, Ky.

[21] Appl. No.: 728,374

[22] Filed: Apr. 29, 1985

[51] Int. Cl.⁵ .................... F16K 24/00; F16L 55/07; F17D 1/02
[52] U.S. Cl. ......................................... 137/1; 137/587; 137/590; 220/DIG. 24; 280/830; 280/838
[58] Field of Search ............... 220/203, 204, DIG. 24; 137/587, 590, 590.5, 593, 344; 280/830, 838

[56] References Cited

U.S. PATENT DOCUMENTS

| 2,685,303 | 8/1954 | Tolley | 137/587 |
| 2,851,193 | 9/1958 | Hobson | 137/590 X |
| 3,662,794 | 5/1972 | Turner | 137/587 X |
| 3,712,334 | 1/1972 | Rolfzen | 137/587 |

Primary Examiner—Allan N. Shoap
Attorney, Agent, or Firm—Richard C. Willson, Jr.; Stanley M. Welsh

[57] ABSTRACT

An intake system comprising a conduit with a valve means which permits only passage of air in one direction overcomes liquid solidification problems associated with transporting liquid sulfur so long as the length of the conduit is sufficient that the free end within the container is below the surface of the transported liquid.

4 Claims, 3 Drawing Sheets

VENT SYSTEM

BACKGROUND OF THE INVENTION

1. Field of the Invention

This invention relates to vent systems used in the storage and transportation of liquids. More particularly, this invention relates to vent systems appropriate to transportation and storage of liquid sulfur.

2. Prior Art

In recent years, due to increased output of sulfur from refining sour crudes into gasoline, efficient ways for transporting and storing enormous quantities of sulfur have had to be developed. Previously, sulfur was transported as a solid in discreet chunks or dispersed in a liquid medium. However, since sulfur can be melted to a liquid at around 250° F., in more recent years it has become more and more common to transport sulfur in a liquid state.

Sulfur in liquid form is usually shipped in tank trucks, railway tank cars, tank barges and tank ships. These tanks are commonly made of steel, which does not corrode if the sulfur is kept hot enough to prevent accumulation of free moisture. To maintain sulfur in a liquid state, the temperature of the sulfur must be maintained high enough so that it melts but not too high as to trigger the formation of high melting allotropic forms. Sulfur is usually transported in tanks having no baffles or other vane like members which would prevent the liquid from slushing about in the tank during transportation, because sulfur on cooling readily plates out.

Containers of liquid sulfur are usually emptied through the bottom and loaded as a liquid through the top. Unfortunately, because of splashing and sublimation, vents to permit introduction of air during the process of unloading often become blocked or plugged. As can be readily imagined, as liquid sulfur is removed from the bottom of a container, air from outside the container must replace the product or liquid sulfur which is removed. Failure to replace the amount of sulfur that is removed from the container with air results in a partial vacuum within the container making additional removal of sulfur more difficult and even dangerous to the structural stability of the container, which for example can be a tank car.

Chipping away at sulfur encrusted vents to ensure the influx of air is potentially dangerous due to the presence of hydrogen sulfide gas, an almost inevitable by-product present in a tank containing liquid sulfur. Other unpleasant and potentially quite dangerous gases present involve sulfur oxides. Sulfur has a freezing point of 114° C. (238° F.) and an approximate melting point of 119° C. (246° F.) with a boiling point of 444° C. (832° F.) Exposure to more than a few hundred parts per million of hydrogen sulfide can cause coughing, eye irritation, loss of sense of smell after 2 to 15 minutes, altered respiration, pain in the eye and drowsiness after 15 to 30 minutes. At 500-700 parts per million, there is risk of loss of consciousness and the possibility of death in one-half to one hour. Excess of 1,000 parts per million can lead to instaneous unconsciousness and death.

If air vents are to be opened by a person seeking to unload a tank car of liquid sulfur, inhalation equipment providing an external source of oxygen must be worn in order to avoid serious health and safety risks.

Efforts to come up with a vent system which is both environmentally safe and does not permit any significant exposure to dangerous vapors such as H$_2$S and sulfur oxides, have proved generally unreliable.

BRIEF DESCRIPTION OF THE INVENTION

It is an object of this invention to overcome deficiencies in the prior art vent systems conventionally used in the transport of liquid sulfur.

It is still another object of this invention to provide a venting system which remains open in the presence of materials which are being transported as a liquid that has melting point at above room temperature, e.g. 70° F.

Other possible applications of this venting system will be clear to a person of skill in the art based upon this Specification.

Briefly, this invention comprises a vapor inlet system or means adapted for connection to a container suitable for storing or transporting liquids. The vapor inlet means comprises a conduit connectable to said container so as to provide a vapor pathway through the body of said container into the interior thereof. Within the conduit is a valve means for limiting flow of fluids, such as vapors or liquids, to a single direction and then only if there is a sufficient differential pressure across the valve means in the direction of flow.

In still another embodiment of this invention, there is a container for transporting or storing a liquid which comprises: a container body having a vapor inlet opening and an outlet for the liquid, wherein in said vapor inlet opening there is a vapor inlet means which comprises a conduit adapted for connection to said opening so as to provide a vapor pathway through said body into the interior of the container and a valve means adapted for connection directly or indirectly to said conduit so that flow of vapor through said conduit into the interior of said body is substantially limited to flow only into the interior of said body and only if there is a sufficient pressure differential across said valve means.

The length of the conduit into the interior of the container in both embodiments must be sufficiently long so that material cannot solidify therein and prevent flow of vapor from outside the container through the valve means and through the conduit into the interior of the container. This avoidance of solidification is discussed in more detail hereinafter and is at the essence of the instant invention.

DETAILED DESCRIPTION OF THE INVENTION

Figure 1:
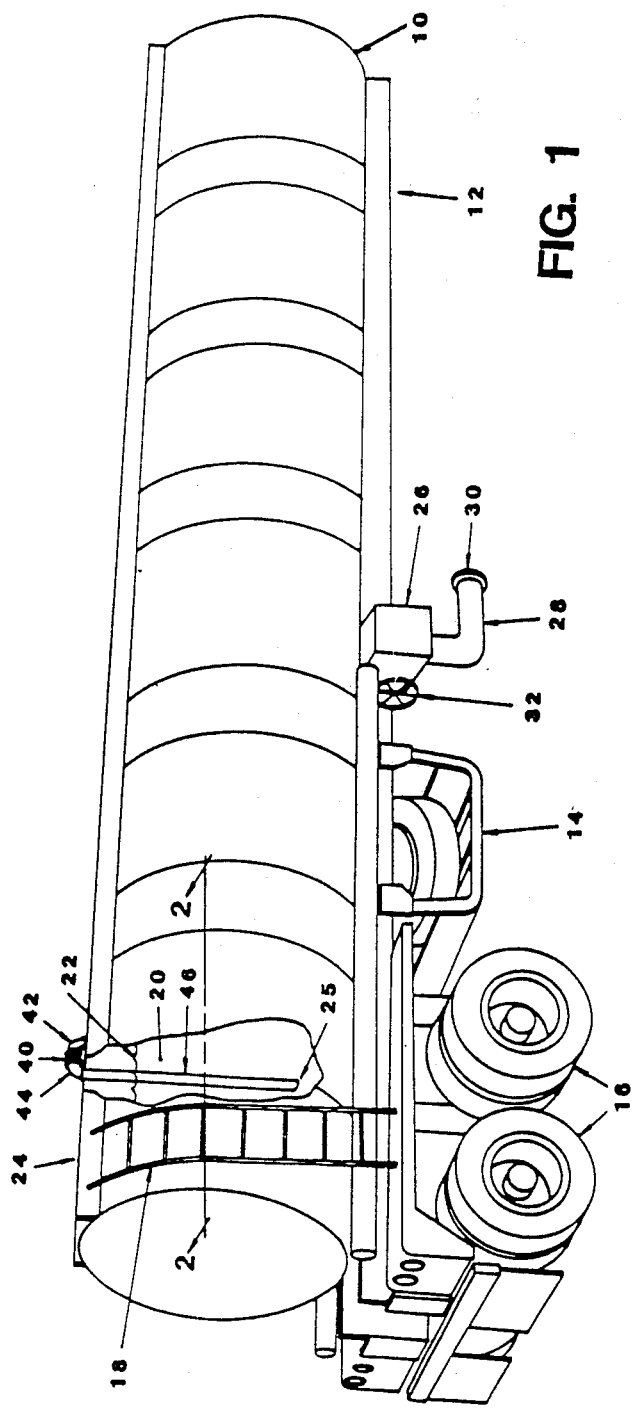
FIG. 1 is a perspective view of an insulated trailer, partially cut-away to disclose its interior in the vicinity of its air vent.

In FIG. 1, there is an insulated, clean bore tank trailer 10 which has the following elements: two inlets, a dome lid inlet 24 and a vapor inlet 23, an outlet controlled by discharge control valve 32 through discharge pipe 28 having a discharge cap 30, two tandem axles on which wheels 16 are mounted, and miscellaneous items such as a ladder 18, spare tire rack 14, fifth wheel plate 12, and steam coil insulation box 26.

In FIG. 1, a portion of trailer 10 has been cut away to reveal a portion of the interior. In the interior, there is a liquid cargo 20 which for example could be liquid sulfur having a free surface 22. The inlet system of FIG. 1 is discussed hereinafter with respect to FIG. 2 which shows an enlarged version of an inlet system of this invention in opening or vent 23.

Critical to the functioning of the instant invention is the fact that dipleg or conduit 46 extends below the free surface 22 of liquid 20. Failure to maintain at least during transporting the liquid level 22 above opening 25 of dipleg 46 runs the risk of having openings 25 of dipleg 46 become plugged with a solidified form of liquid 20.

While not wanting to be bonded by any theory of operation, it is believed that a plug of trapped vapor within conduit 46 prevents liquid 20 from entering to too great an extent into conduit 46, whereby substantially all of liquid 20 which does enter remains sufficiently below free surface 22 so as to remain molten due to the temperature of molten liquid 20. Clearly, the orientation of conduit 46 is preferably substantially vertical. Opening 25 is sufficiently below surface 20 so that any liquid 20 which enters into conduit 46 remains sufficiently molten or in liquid form through contact with liquid 20. For, if liquid 20 were to rise in conduit 46 at or above surface 22, it might solidify as surface 22 sometimes does. Also opening 25 must not be too close to a wall surface of tank 10, since the risk from plugging increases due to plating out near a wall surface.

Trailer 10 is insulated so as to maintain the heat content of liquid 20 during transport. In some instances, trailer 10 is equipped with steam coils to supply heat to the cargo to maintain it in a liquid state. Methods for insulating and/or providing heat to cargo within container 10 are well known to those of skill in the art.

In operation, container or trailer 10 would operate as follows. Through dome lid 24 is an opening which permits the loading of liquid 20 into tank trailer 10. As tank trailer 10 fills up with liquid, at some point opening 25 of dipleg 46 becomes covered with liquid. There is some compression of air contained within dipleg 46 which acts as a plug keeping any molten liquid 20 which enters into dipleg 46 below surface 22 of the fully loaded tank trailer 10. Maintaining the amount of molten liquid 20 in dipleg 46 below surface 22 has been found to generally be critical to preventing any plugging of dipleg or conduit 46. Tank trailer 10 is connected to a trailer by means of fifth wheel plate 12 or other means of attachment well known and understood to persons of skill in the art.

The process of unloading is through discharge pipe 28. At one end of discharge pipe 28, preferably made of stainless steel, is a discharge cap 30. Discharge cap 30 snaps over the end of discharge pipe 28. Discharge cap 30 may also be threaded onto the end of pipe 28 and is there mainly to prevent from escaping any material which by some mischance leaks past a discharge valve (not shown) upstream of discharge pipe 28. Discharge valve (not shown) is controlled by discharge valve control 32 and is contained within a steam coil insulation box 26. The steam coil insulation box 26 maintains the temperature of the valve so that liquid 20 stays at a temperature sufficient to permit passage of molten liquid 20 on discharge. As molten liquid 20 is discharged through discharge pipe 28, a differential in pressure occurs across check valve 40. Check valve 40 is arranged to permit the flow of vapor only into the interior of tank 10 through dipleg 46. It is readily understood by a person of skill in the art what the differential pressure should be so that the structural integrity of the walls of trailer 10 is not at risk and the chance of escape of vapor out of the tank is very small to substantially non-existent.

It is within the contemplation of this invention to make available or have applicable a vent system which would permit release of vapors from the interior of the tank to the outside in the event that undesirably high pressures build up within the tank for whatever reason. Such a valve would likely not be desirable in connection with dipleg or conduit 46 because any pressure relief through such a valve could carry with it some of liquid 20. Though such is generally not a desirable arrangement, it is within the contemplation of this invention to have such a valve means in association with dipleg 46.

Figure 2:
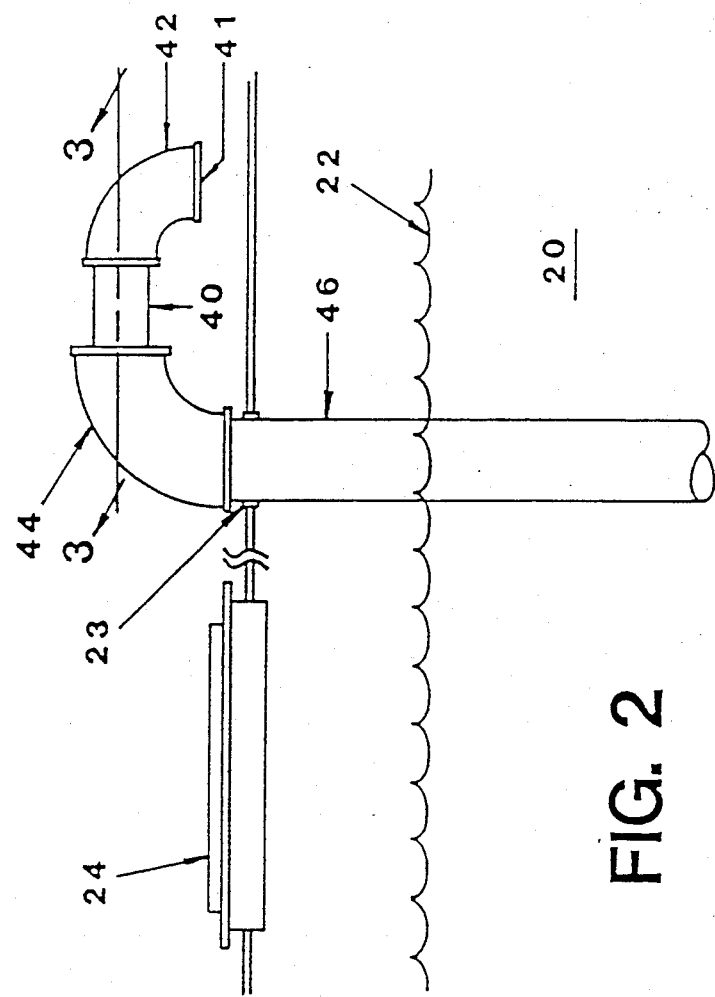
FIG. 2 is an enlarged view in cross-section of the area surrounding a dome lid and air vent shown in FIG. 1 along line 2—2 of FIG. 1.

FIG. 2 provides additional detail about a vent system of this invention. Only a portion of tank 10 in the vicinity of dome lid 24 and vapor opening 23 having conduit 46 therethrough is shown with a threaded portion so as to provide a suitable means for connecting conduit 46 to opening 23 of trailer 10. Opening 23 is usually about 3 inches, and in one preferred embodiment dipleg 46 is roughly two inches in diameter.

Figure 3:
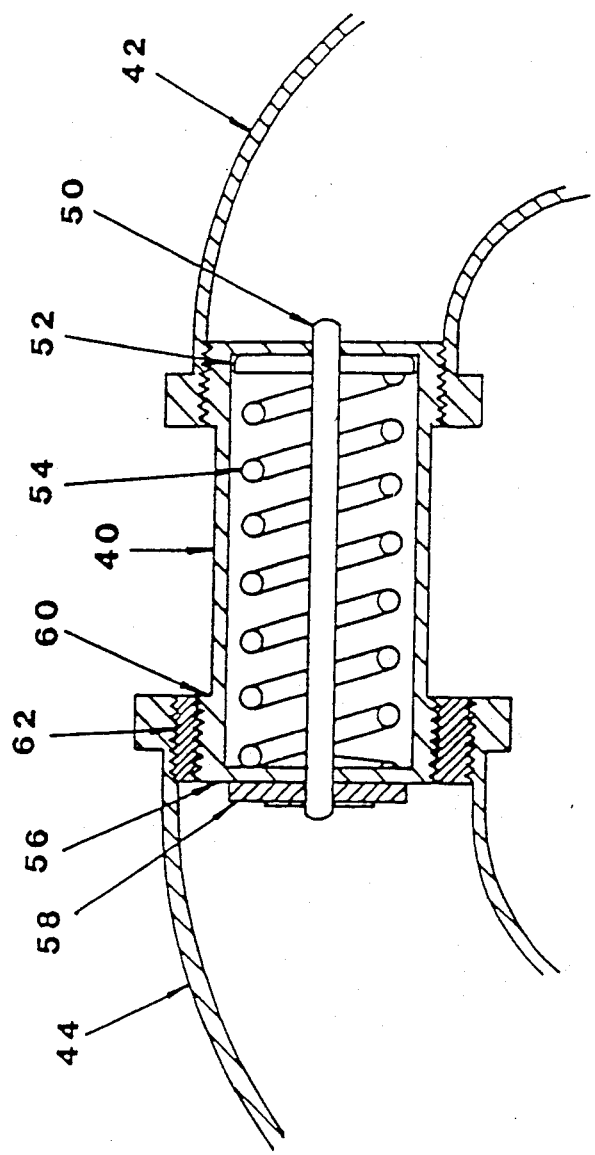
FIG. 3 is an enlarged view in cross-section of a spring biased one-way check valve such as disclosed in FIGS. 1 and 2 along line 3—3 of FIG. 2.

One way valve 40 in enlarged cross-section in FIG. 3 comprises a threaded housing 60 within which is a valve seat 56, a valve 58, a biasing spring 54 and a spring stop 52 and a valve rod 50. One way valve 40 is an example of a commonly available single direction valve which permits flow into dipleg 46 of vapors outside trailer 10 when the pressure across the valve reaches a value greater than that imposed by biasing spring 54. When the differential pressure across the valve overcomes the biasing imposed by spring 54, valve rod 50 moves in FIG. 3 to the left making an opening sufficient to permit flow past and between valve 58 and valve seat 56.

Valve 40 by means of a threaded adapter 62 is corrected with threaded housing 60 to section 44, a portion of dipleg 46, shown for purposes of preferred illustration only, having a horizontal portion. Surrounding valve 40 is a spigot 42 threaded into connection with a portion of threaded housing 60 of valve 40. Spigot 42 has an opening 41 preferably directed downwardly to act as a splash guard to prevent entrance of liquids. The particular type of check valve 40 in dipleg 46 is one of a variety of such valves that are useful in this invention.

The key to the functioning of the instant invention is that flow of vapor through check valve 40 is only in the direction interior to tank 10 and that opening 25 of dipleg 46 is sufficiently below the free liquid level 22 of liquid 20 so that any tendency of the liquid to rise up in dipleg 46 due to pressure or splashing or sublimation will be such as to prevent any plugging therein. The opening of dipleg 46 must be sufficient large so that even in the presence of some sublimation and plating out there will not be a blocking off of dipleg 46.

In FIG. 2, dome lid 24 is preferably hinged to tank car 10 so as to be readily openable for purposes of loading. Once tank car 10 is loaded it is desirable for purposes of safety that virtually no vapors escape from tank 10.

Since most tank cars are not structurally designed to be pressure vessels, the amount of pressure differential desirable before flow of vapor passes through valve 40 is preferably not greater than about one to two pounds and more preferably not much more than necessary to ensure that vapors do not escape. Clearly, if the differential pressure gets to be too great, then the structure integrity of the container for transporting or storing liquid 20, e.g. sulfur, could be seriously damaged.

Although a particular embodiment is disclosed in the detailed description of this invention, variations on that disclosed embodiment are readily apparent to one of skill in the art once the purpose and method of achieving that purpose have been revealed by the instant Specification.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein. For example, the location of discharge pipe 28, insulation box 26 and cut-off valve control 32 could be at one end, preferably in the rear of tank car 10 for ease in unloading, especially on a slope.

What is claimed is:

1. A container for transporting or storing a molten liquid, said container comprising a body having a vapor inlet and an outlet for said liquid, wherein said vapor inlet comprises: a conduit adapted for connection to said container so as to provide a vapor pathway through said body into said container and a valve means adapted for connection to said conduit so that vapor will flow through said valve means into said container through said conduit only in one direction and only when a pressure differential across said valve means reaches some minimum value, wherein said conduit extends within said container a sufficient distance so that when there is molten liquid within said container, an opening at one end of said conduit extends below a free surface of said liquid and liquid level within said conduit remains sufficiently below said free surface of said liquid that material within said conduit remains molten during storage or transport due to heat transfer into said conduit from said molten liquid in said container; whereby clogging by material solidifying within said conduit is avoided, ensuring free passage of vapors into said container to replace any liquid removed.

2. The container of claim 1 wherein said molten liquid comprises sulfur.

3. A method for forming a vapor intake system during transport or storage of a liquid having a melting point at least 70° F. or above comprising:

A. introducing said liquid in a molten state into a container comprising: a body having a vapor inlet and an outlet for said liquid, wherein said vapor inlet comprises a conduit adapted for connection to said container so as to provide a vapor pathway through said body into said container by means of an opening at one end of said conduit; and a valve means adapted for connection to said conduit so that vapor will flow through said valve means into said container through said conduit only in one direction and only when a pressure differential across said valve means reaches some minimum value; and wherein said conduit extends a sufficient distance into the interior of said body so that when there is a liquid during storage or transport within said container, said opening at one end of said conduit extends below a free surface of said liquid so that even if the molten liquid partially solidifies during transport or storage, material within said conduit remains molten, and wherein the opening at one end of said conduit is sufficiently far from any surface upon which material will solidify to avoid said opening at said one end from becoming blocked due to such solidification; and B. maintaining most of said molten liquid at a temperature which maintains it in a liquid state;

whereby molten liquid from said container can be withdrawn without creating an undesirably reduced pressure within the body of the container.

4. The method of claim 3, wherein said molten liquid comprises sulfur.

* * * * *